United States Patent [19]

Wissgott et al.

[11] Patent Number: 4,743,457

[45] Date of Patent: May 10, 1988

[54] TREATMENT OF FRUIT AND VEGETABLE MATERIAL

[75] Inventors: Ulrich Wissgott, La Tour-de-Peilz; Alexis Berberat, Corseaux, both of Switzerland

[73] Assignee: Nestec S.A., Vevey, Switzerland

[21] Appl. No.: 792,797

[22] Filed: Oct. 30, 1985

Related U.S. Application Data

[63] Continuation-in-part of Ser. No. 699,172, Feb. 7, 1985, abandoned.

[51] Int. Cl.⁴ .................................................. A23B 7/14
[52] U.S. Cl. ....................................... 426/321; 426/615
[58] Field of Search ............... 426/615, 102, 253, 262, 426/265, 273, 302, 307, 331, 321

[56] References Cited

U.S. PATENT DOCUMENTS 3,352,691 11/1967 Li et al. ................................. 426/615
4,344,971 8/1982 Garbutt ................................. 426/615

OTHER PUBLICATIONS

Chichester, 1971, Adv. in Food Research, Academic Press, New York, pp. 78, 79, 128 and 129.
Lee, 1975, Basic Food Chemistry, Westport CT, AVI Publishing Co., Inc. p. 168.

Primary Examiner—Raymond N. Jones
Assistant Examiner—Carolyn Paden
Attorney, Agent, or Firm—Vogt & O'Donnell

[57] ABSTRACT

A process for treating fruit and vegetable materials to inhibit the formation of a reddish colouration during heat processing which comprises adding an effective amount of a protein to the fruit or vegetable material.

25 Claims, No Drawings

TREATMENT OF FRUIT AND VEGETABLE MATERIAL

This application is a continuation-in-part application of Ser. No. 699,172, filed Feb. 7, 1985, now abandoned.

The present invention relates to a method of treating fruit and vegetable materials, more particularly for inhibiting the formation of a reddish colouration during heat treatment thereof.

The problem of pink or red discolouration has been observed and described for various fruits and vegetables, such as bananas, pears, apples, cabbage, cauliflower, beans and white onions. It is due to heat processing, for example, in canning (thermal sterilisation) and dehydration (concentration, drying) of the fruit or vegetable either whole, sliced or in the form of a homogeneous pulp. For example, banana pulp, sometimes referred to as banana puree, is a pure banana product particularly desirable for the baby food market. However, bananas fall into a class of low-acid foods (i.e., having a pH above 4.6) which, when sterilised in glass jars for the production of a baby food product, require a higher degree of sterilisation than acid fruits and it has been found that an undesirable reddish colouration is formed during such sterilisation.

We have established that this reddish colouration is caused by the excessive heat treatment during sterilisation. Reddening is usually accelerated in rate and enhanced in intensity by increased temperature, heating time and acidification. Nevertheless, if the banana pulp is acidified to a pH of approximately 4.2, for example with citric acid, then a higher degree of sterilisation is unnecessary and consequently the undesirable reddish colouration is not formed. However, the addition of acid affects the taste of the product and sugar usually has to be added to try to mask the acidity.

Certain additives are known which can prevent discolouration in foods, for example, sodium bisulphite, cysteine and complexing compounds such as phosphates, or ethylene diamine tetraacetic acid in admixture with either ascorbic acid or citric acid. However, although sodium bisulphite is effective in certain proportions for inhibiting the reddish colouration in banana pulp, its use as a food additive is questionable. With regard to cysteine, although it inhibits the reddish colouration during sterilisation, it was found opon opening the glass jars, that a repulsive odour had developed, thus making the final product unacceptable for the consumer. Phosphates were not found to be successful in inhibiting the reddish colouration and the mixtures containing ethylene diamine tetraacetic acid did not suppress the reddish colouration sufficiently.

We have found, surprisingly, that the reddish colouration formed during the heat processing of fruit and vegetable materials can be inhibited by adding a protein to the fruit or vegetable material.

Accordingly, the present invention provides a process for treating fruit and vegetable materials to inhibit the formation of a reddish colouration during heat processing characterised in that an effective amount of a protein is added to the fruit or vegetable material.

The colour development is associated with the presence of leucoanthocyanidins which are the precursors of the red pigment. The leucoanthocyanidins are colourless compounds, naturally present in various plant materials. Although we do not wish to be bound by theory, it is thought that their undesirable transformation into red pigments is due to hydrolytic and oxidative reactions which accompany the heat processing. Therefore, the process of the present invention is applicable to fruit and vegetable materials which contain significant amounts of leucoanthocyanidins, for example bananas, pears, apples, cabbages, cauliflowers, beans and white onions.

The pink or red colouration may be formed during any heat processing treatment, for example, thermal sterilisation, pasteurisation, concentration or drying. The formation of the undesirable colour generally occurs at a temperature from 80° C. to 150° C. for a time from 3 hours to less than 1 minute, longer periods of time being required at lower temperatures. The formation of this undesirable colour during such heat processing can be prevented by the process of the present invention particularly when the temperature is from 90° C. to 140° C. and the time is from 2 hrs to 5 min., especially 100° C. to 130° C. for from 1 hr to 15 mins.

In the case of thermal sterilisation and pasteurisation, the protein is added to the fruit or vegetable material before the sterilisation or pasteurisation treatment begins. However, with regard to dehydration, although it is preferable and more convenient to add the protein before the dehydration treatment begins, it is possible to add the protein during the treatment but before any pink colouration has formed and preferably before the temperature has reached 80° C.

The protein may be of animal or vegetable origin and is advantageously derived from milk, egg, animal tissue or soya, for example, products containing substantial amounts of protein such as skim milk powder, whey protein powder, egg yolk powder, egg white powder, ovalbumine powder, gelatine or a caseinate. The protein used is preferably substantially water-soluble and may conveniently be dissolved in a little water before adding it to the fruit or vegetable material.

The effective amount of protein depends on the protein quality and also on the amount of leucoanthocyanidin present in the fruit or vegetable material which may vary for the same fruit or vegetable depending on the variety and the degree of ripeness. However, the amount of protein necessary to inhibit the reddish colouration can readily be determined by trial and error and is usually at least 2% by weight based on the weight of the fruit or vegetable. Excessive amounts of protein, however, tend to provoke a brownish colouration which may or may not be undesirable. For example, in a banana product a slight brownish colouration may be considered desirable because it imparts an appearance of ripeness. The amount of protein which provokes a brownish colouration varies with the protein but generally above 12% of any protein will provoke the brown colour.

By way of illustration, the preferred amounts of skim milk powder containing 34% protein are between 2% and 5% by weight and especially from 2.5% to 4.5% by weight based on the weight of fruit or vegetable material. The preferred amounts of whey protein containing 80% protein are from 3% to 8% and especially from 4% to 7% by weight based on the weight of fruit or vegetable material. The preferred amounts of egg protein containing 25%–96% protein are from 5% to 12% and especially from 6% to 10% by weight based on the weight of the fruit or vegetable. The preferred amounts of soya protein containing 95% protein are from 4% to 8% and especially from 5% to 7% by weight based on the weight of the fruit or vegetable material. The preferred amounts of gelatin or caseinates are from 3% to 7% and especially from 4% to 6% by weight based on the weight of the fruit or vegetable material.

The fruit or vegetable material may be in any physical form, for example, whole or as solid pieces of any shape or size, a mash, or a homogeneous pulp such as a puree, provided that there is some contact between the leucoanthocyanidin pigment precursors and the protein. Preferably, the solid pieces have a volume less than 20 cubic millimeters, and in the case of bananas, apples and pears, the solid pieces are conveniently in the form of chucks or cubes especially of a size similar to the sizes normally used in canned fruit salads. Where appropriate, the fruit or vegetable is preferably stripped of its outer coating or peeled before treatment.

The treatment may be carried out by contacting the fruit or vegetable material with the protein before the heat processing step, for instance by soaking in a solution of the protein. In the case of solid pieces, the protein solution is preferably separated before the solid pieces are heat-treated.

The present invention is further illustrated by the following examples in which the skim milk powder used contains 34% protein, the whey protein powder is a concentrate-WPF 80 sold by Pont-Hébert containing 76% protein, the egg yolk powder is dried egg yolk containing 29% protein, the egg white powder is dried egg white containing 81% protein and the ovalbumine powder contains 96% protein.

EXAMPLE 1

4 g of skim milk powder were dissolved in 10 ml tap water and then mixed with 100 g banana puree. The mixture was then filled into a 100 ml glass jar which was closed with a twist-off lid, and sterilised in an autoclave at 121° C. for 30 minutes. The colour observed after sterilisation was an attractive yellow similar to the normal colour of bananas.

COMPARATIVE EXAMPLE A

By carrying out a similar procedure to that described in Example 1 but using 2 g skim milk powder, an undesirable reddish colouration was observed after sterilisation.

COMPARATIVE EXAMPLE B

By carrying out a similar procedure to that described in Example 1 but using 10 g skim milk powder, a brownish colouration was observed after sterilisation.

EXAMPLE 2

By carrying out a similar procedure to that described in Example 1 but using 4.5 g of whey protein powder instead of 4 g of skim milk powder, the colour observed after sterilisation was an attractive yellow similar to the normal colour of bananas.

EXAMPLE 3

By carrying out a similar procedure to that described in Example 2 but using 5.6 g of whey protein powder, the colour observed after sterilisation was again an attractive yellow similar to the normal colour of bananas.

COMPARATIVE EXAMPLE C

By carrying out a similar procedure to that described in Example 2 but using 2.2 g of whey protein powder, the colour observed after sterilisation was an undesirable salmon pink.

COMPARATIVE EXAMPLE D

By carrying out a similar procedure to that described in Example 2 by using 8.8 g of whey protein powder, the colour observed after sterilisation was brown.

EXAMPLE 4

By carrying out a similar procedure to that described in Example 1 but using 6.3 g of egg yolk powder instead of 4 g of skim milk powder, the colour observed after sterilisation was an attractive yellow similar to the normal colour of bananas.

COMPARATIVE EXAMPLE E

By carrying out a similar procedure to that described in Example 4 but using only 2.5 g of egg yolk powder, the colour observed after sterilisation was an undesirable salmon pink.

EXAMPLE 5

By carrying out a similar procedure to that described in Example 1 but using 8.8 g of egg white powder instead of 4 g of skim milk powder, the colour observed after sterilisation was an attractive yellow similar to the normal colour of bananas.

COMPARATIVE EXAMPLE F

By carrying out a similar procedure to that described in Example 5 but using only 2.2 g of egg white powder, the colour observed after sterilisation was an undesirable salmon pink.

EXAMPLE 6

By carrying out a similar procedure to that described in Example 1 but using 8.8 g of ovalbumine powder instead of 4 g skim milk powder, the colour observed after sterilisation was an attractive yellow similar to the normal colour of bananas.

COMPARATIVE EXAMPLE G

By carrying out a similar procedure to that described in Example 6 but using only 3.8 g of ovalbumine powder, the colour observed after sterilisation was an undesirable pink.

EXAMPLE 7

Separate 100 g samples of pure banana puree and banana puree to which has been added 5 g of whey protein powder were placed in glass jars which were closed with a lid and placed in a bath containing boiling water. The colour of the banana puree in each jar was observed every half hour and the results are shown in the following Table I

TABLE I

| Heating time (hrs) | Colour of banana puree without additive | Colour of banana puree with addition of protein |
|---|---|---|
| 0.5 | Yellow | Yellow |
| 1.0 | Yellow | Yellow |
| 1.5 | Pink | Yellow |
| 2.0 | Pink | Yellow |
| 2.5 | Pink | Yellow |
| 3.0 | Red | Pink |
| 3.5 | Red | Pink |
| 4.0 | Red | Pink |
| 4.5 | Red | Pink |

TABLE I-continued

| Heating time (hrs) | Colour of banana puree without additive | Colour of banana puree with addition of protein |
| --- | --- | --- |
| 5.0 | Red | Red |

As clearly shown the discolouration of banana puree is suppressed for a significantly longer period of time when whey protein is added before the thermal treatment.

EXAMPLE 8

Pears were mashed to a pulp and 5% weight/weight of whey protein powder were added. The mixture was then filled into a glass jar and sterilised at 121° C. for 30 minutes. After sterilisation, the colour of the pulp was yellow, similar to the natural colour of pear pulp.

COMPARATIVE EXAMPLE H

Cubes of pears similar to those normally used in canned fruit salads were put into a syrup containing 20% sugar and sterilised in glass jars at 121° C. for 30 minutes. Both the pears and the syrup were found to be red coloured after this sterilisation.

EXAMPLE 9

By following a similar procedure to that described in Example 1 but using 5 g of gelatin powder (FLUKA) instead of 4 g of skim milk powder, the colour observed after sterilisation was an attractive yellow similar to the natural colour of bananas.

COMPARATIVE EXAMPLE J

By following a similar procedure to that described in Example 9 but using only 1 g of gelatin powder (FLUKA), the colour observed after sterilisation was an undesirable pink.

EXAMPLE 10

By following a similar procedure to that described in Example 1 but using 5 g of calcium caseinate instead of 4 g of skim milk powder, the colour observed after sterilisation was an attractive yellow similar to the natural colour of bananas.

COMPARATIVE EXAMPLE K

By following a similar procedure to that described in Example 10 but using only 2 g of calcium caseinate, the colour observed after sterilisation was an undesirable pink.

EXAMPLE 11

100 g of pears similar to those normally used in canned fruit salads were cut into cubes and soaked for one hour in 100 ml of an aqueous solution containing 5% by weight of whey protein powder based on the weight of water. The protein solution was then separated from the pear cubes which were then filled into glass jars together with a syrup containing 20% sugar and sterilised at 121° C. for 30 minutes. After sterilisation, the colour of the pears was unchanged.

What is claimed is:

1. A process for treating a food selected from the group consisting of fruits and vegetables containing red pigment precursors to inhibit formation of a reddish coloration of the food which occurs during heat processing of the food comprising adding protein, which is in a substantially water-soluble form, to the food for contacting red pigment precursors, in an amount effective to inhibit the formation of reddish coloration of the food by the pigment precursors during heat processing.

2. A process according to claim 1 further comprising adding the protein to the food during heat processing of the food prior to the food having reached a temperature of 90° C.

3. A process according to claim 2 wherein the protein is added to the food prior to the food having reached a temperature of 80° C.

4. A process according to claim 1 further comprising adding the protein to the food prior to heat processing the food.

5. A process according to claim 4 wherein the protein is added by soaking the food in a solution of the protein.

6. A process according to claim 5 wherein the food is in the form of an homogeneous pulp.

7. A process according to claim 6 wherein the food is banana.

8. A process according to claim 5 wherein the food is in the form of solid pieces.

9. A process according to claim 8 wherein the pieces are in the form of cubes.

10. A process according to claim 8 further comprising separating the food with the added protein from the solution of the protein prior to heat processing the food.

11. A process according to claim 1 wherein the effective amount of protein is at least 2% by weight based upon the weight of the food.

12. A process according to claim 1 wherein the protein is derived from a substance selected from the group consisting of milk, egg, animal tissue and soya.

13. A process according to claim 1 wherein the protein is contained in a substance selected from the group consisting of skim milk powder, whey protein powder, egg white powder, egg yolk powder, ovalbumine powder, caseinate in a substantially water-soluble form and gelatin.

14. A process according to claim 1 wherein the protein is contained in a skim milk powder which is added to the food in an amount of from 2.5% to 4.5% by weight based on the weight of the food.

15. A process according to claim 14 wherein the skim milk powder contains 34% protein.

16. A process according to claim 1 wherein the protein is contained in a whey protein powder which is added to the food in an amount of from 4% to 7% by weight based on the weight of the food.

17. A process according to claim 16 wherein the whey protein powder contains 80% protein.

18. A process according to claim 1 wherein the protein is egg containing 25% to 96% protein which is added to the food in an amount of from 6% to 10% by weight based on the weight of the food.

19. A process according to claim 1 wherein the protein is soya which is added to the food in an amount of from 5% to 7% by weight based on the weight of the food.

20. A process according to claim 19 wherein the soya contains 95% protein.

21. A process according to claim 1 wherein the protein is selected from the group consisting of gelatin and caseinate which is added to the food in an amount of from 4% to 6% by weight based on the weight of the food.

22. A process according to claim 1 further comprising heat processing the food by a process selected from the group consisting of thermal sterilization, pasteurization and thermal concentration and thermal drying.

23. A process according to claim 1 further comprising heat processing the food at a temperature of from 90° C. to 140° C. for a period of from 1 hour to 5 minutes.

24. A process according to claim 1 wherein the food is selected from the group consisting of bananas, pears, apples, cabbages, cauliflowers, beans and white onions.

25. A process according to claim 1 wherein the pigment precursors are leucoanthocyanidins.

* * * * *

UNITED STATES PATENT AND TRADEMARK OFFICE
CERTIFICATE OF CORRECTION

PATENT NO. : 4,743,457

DATED : May 10, 1988

INVENTOR(S) : Ulrich Wissgott, et al.

It is certified that error appears in the above-identified patent and that said Letters Patent is hereby corrected as shown below:

Column 2, in each of lines 12, 18, 19 and 28, "C." should be --C--.

Column 3, line 37, "C." should be --C--.

Column 4, line 6, "by" should be --but--.

Column 5, in each of lines 15, 22 and 60, "C." should be --C--.

Column 7, in each of lines 4 and 5, [lines 1 and 2 of claim 23], "C." should be --C--.

Signed and Sealed this

Eighteenth Day of October, 1988

Attest:

DONALD J. QUIGG

*Attesting Officer*  *Commissioner of Patents and Trademarks*